(12) United States Patent
Ashwood-Smith (10) Patent No.: US 8,761,053 B2
(45) Date of Patent: Jun. 24, 2014

(54) LINK STATE FAST FLOOD WITH COMPUTED MULTI-PROTOCOL-LABEL-SWITCHING (MPLS) BROADCAST TREE

(75) Inventor: Peter Ashwood-Smith, Gatineau (CA)

(73) Assignee: Futurewei Technologies, Inc., Plano, TX (US)

( * ) Notice: Subject to any disclaimer, the term of this patent is extended or adjusted under 35 U.S.C. 154(b) by 175 days.

(21) Appl. No.: 13/370,044

(22) Filed: Feb. 9, 2012

(65) Prior Publication Data

US 2013/0208624 A1    Aug. 15, 2013

(51) Int. Cl.
  *H04L 12/44*    (2006.01)
(52) U.S. Cl.
  USPC ............................................ 370/256; 370/408
(58) Field of Classification Search
  USPC ........... 370/235, 256, 400, 408; 709/223–226
  See application file for complete search history.

(56) References Cited

U.S. PATENT DOCUMENTS

| | | | |
|---|---|---|---|
| 8,077,726 B1* | 12/2011 | Kumar et al. | 370/395.31 |
| 2002/0141346 A1* | 10/2002 | Garcia-Luna-Aceves et al. | 370/238 |
| 2006/0002297 A1* | 1/2006 | Sand et al. | 370/235 |
| 2006/0268879 A1* | 11/2006 | Xhafa et al. | 370/392 |
| 2007/0070983 A1* | 3/2007 | Redi et al. | 370/352 |
| 2008/0198753 A1* | 8/2008 | Choudhury et al. | 370/242 |
| 2011/0058567 A1* | 3/2011 | Wijnands et al. | 370/401 |

OTHER PUBLICATIONS

"Media Access Control (MAC) Bridges and Virtual Bridged Local Area Networks—Amendment 8: Shortest Path Bridging," Draft Standard for Local and Metropolitan Area Networks—IEEE P802.1aq/D4.5, Feb. 6, 2012, 359 pages.

* cited by examiner

*Primary Examiner* — Paul H Masur
(74) *Attorney, Agent, or Firm* — Conley Rose, P.C.; Grant Rodolph; Rayhao Chung (57) ABSTRACT

A link state network comprising a plurality of interconnected nodes, and a multiprotocol label switching (MPLS) tree established amongst at least some of the interconnected nodes, wherein the MPLS tree is associated with an MPLS label, and wherein the interconnected nodes are configured to deterministically forward a plurality of link state update (LSU) packets comprising the MPLS label over the MPLS tree.

20 Claims, 11 Drawing Sheets

LINK STATE FAST FLOOD WITH COMPUTED MULTI-PROTOCOL-LABEL-SWITCHING (MPLS) BROADCAST TREE

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Scalability and other issues begin to arise as conventional communications networks become larger and larger, e.g., comprising more and more nodes. In networks comprising a single autonomous system (AS) domain, for instance, each node in the same level or area must be aware of the positional relationships (i.e., adjacencies) of all other nodes in the same level or area, such that all nodes may build a topological map of their level or area of the network. Nodes may learn about one another's adjacencies by flooding link-state information throughout the network according to one or more interior-gateway-protocols (IGPs), e.g., open shortest path first (OSPF), intermediate system (IS) to IS (IS-IS), etc. Specifically, nodes engaging in IGPs may distribute their own link state advertisements (LSAs) (e.g., describing their own adjacencies), as well as forward any received LSAs, to all their neighboring nodes. This flooding behavior allows all network nodes to become aware of one another's adjacencies, and consequently allows all the network nodes to develop a topological understanding of the link state network. LSAs may be flooded upon network initialization as well as whenever a network adjacency changes (e.g., a node is added-to/removed-from the network, a node/link fails, etc.). Consequently, as more nodes are added to an AS domain, link state distributions begin to take longer and longer, thereby extending convergence/re-convergence periods. As such, a faster and more efficient method for flooding link state packets is desired.

SUMMARY

Disclosed herein is a link state network comprising a plurality of interconnected nodes, and a multiprotocol label switching (MPLS) tree established amongst at least some of the interconnected nodes, wherein the MPLS tree is associated with an MPLS label, and wherein the interconnected nodes are configured to deterministically forward a plurality of link state update (LSU) packets comprising the MPLS label over the MPLS tree.

Also disclosed herein is a network node in a link state network comprising a plurality of interfaces including a first interface, a second interface, and a third interface, wherein each interface is linked to a different one of a plurality of neighboring nodes in the link state network, and wherein an MPLS tree is configured on the first interface and the second interface, but not on the third interface, and a nodal control processor for performing MPLS functions, wherein the MPLS nodal control processor is configured to replicate a LSU packet received on the first interface to produce a plurality of replicated LSU packets, and forward a first one of the replicated LSU packets over the second interface (comprising the MPLS label) without forwarding any of the replicated LSU packets over the third interface.

Also disclosed herein is a method comprising generating a LSU packet describing one or more nodal adjacencies in a link state network, wherein the link state network comprises a plurality of nodes at least some of which reside on an MPLS tree extending through the link state network, appending an MPLS label to the LSU packet, wherein the MPLS label is associated with the MPLS tree, and deterministically forwarding the LSU packet over the MPLS tree.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is a method and technique for deterministically forwarding link state packets through a link state network according to a computed MPLS tree. Specifically, deterministically forwarding link state packets according to aspects of this disclosure may achieve fewer link state distributions by avoiding redundant link state distributions (e.g., forwarding a link state packet to a node who previously received the link state packet), as well as achieve quicker convergence periods by avoiding delays attributable to interior gateway protocol (IGP) and link state processing. In an embodiment, deterministically may mean that when a distributed instance of an algorithm is faced with multiple choices for a solution it will pick one of the choices in such a manner as its choice is predictable to all the other distributed instances of the computation. In this manner the set of distributed computations may work together to produce their part of a common result with the assurance that the end, complete result, is exactly the desired result. In an embodiment, an MPLS tree may be set up in the link state network. A global MPLS label may be associated with the MPLS tree, and any link state packets that are appended with the global MPLS label may be forwarded on the MPLS tree. This forwarding may be performed by hardware (e.g., by an MPLS nodal control processor), rather than by the CPU in charge of link state operations.

Figure 1:
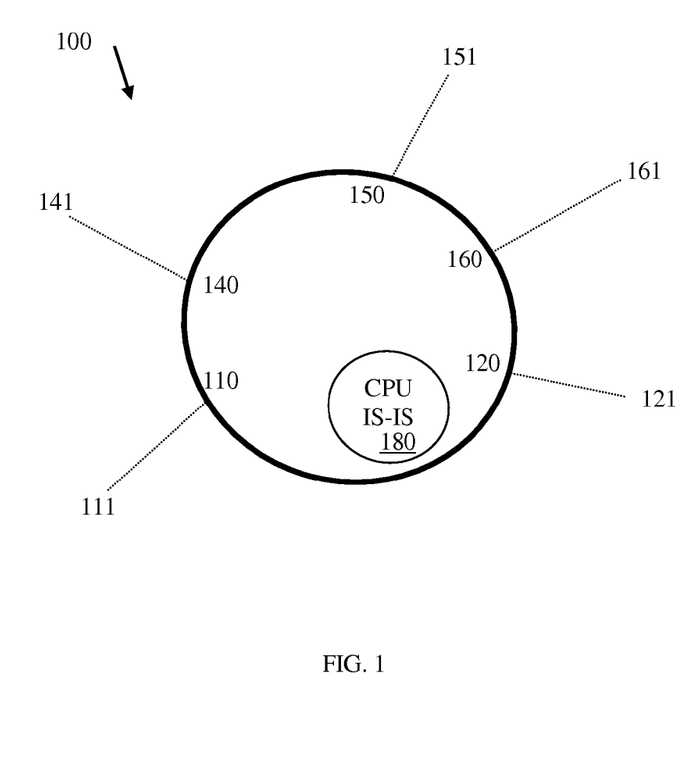
FIG. 1 illustrates a conventional node.

FIG. 1 illustrates a node 100 that may reside in a conventional link state network. The node 100 may comprise a plurality of interfaces 110, 120, 140, 150, 160 and an IS-IS central processing unit (CPU) 180. Each of the interfaces 110, 120, 140, 150, 160 may be connected to one of a plurality of neighboring nodes in the link state network via a respective one of a plurality of links 111, 121, 141, 151, 161. The IS-IS CPU 180 may be any processor that is capable of performing link state operations, such as building/updating link-state databases (LSDBs) and forwarding link state packets according to an IGP.

Figure 2:
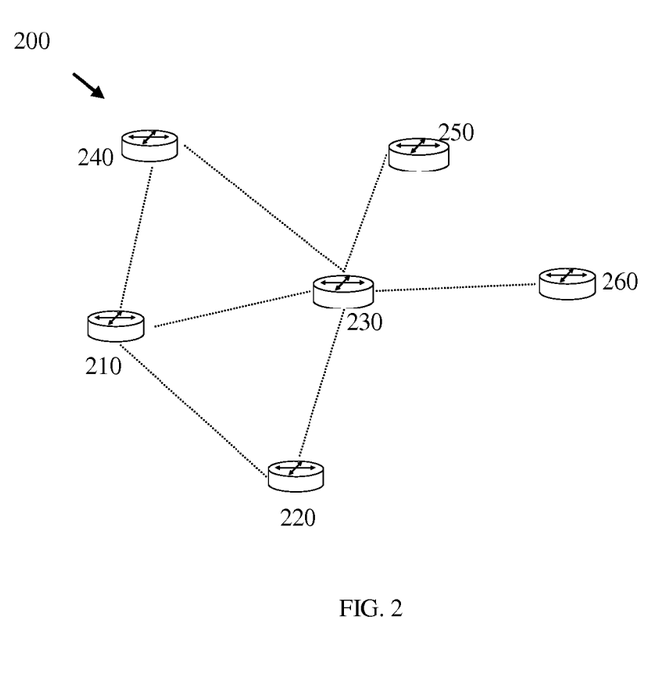
FIG. 2 illustrates a conventional link state network.

FIG. 2 illustrates a link state network 200 comprising a plurality of network nodes 210-260. In an embodiment, the network node 230 may correspond to the node 100 (depicted in FIG. 1), and the network nodes 210, 220, 240, 250, and 260 may correspond to the neighboring nodes connected to the node 100 via the links 111, 121, 141, 151, 161 (respectively). In an embodiment, the network nodes 210-260 may be any device capable of switching data within the link state network 200. In some embodiments, the link state network 200 may correspond to an AS domain, in which link state information pertaining to the adjacencies of the various nodes 210-260 is distributed to each of the other nodes 210-260, thereby allowing the nodes 210-260 to develop a topological understanding of the link state network 200.

Figure 3:
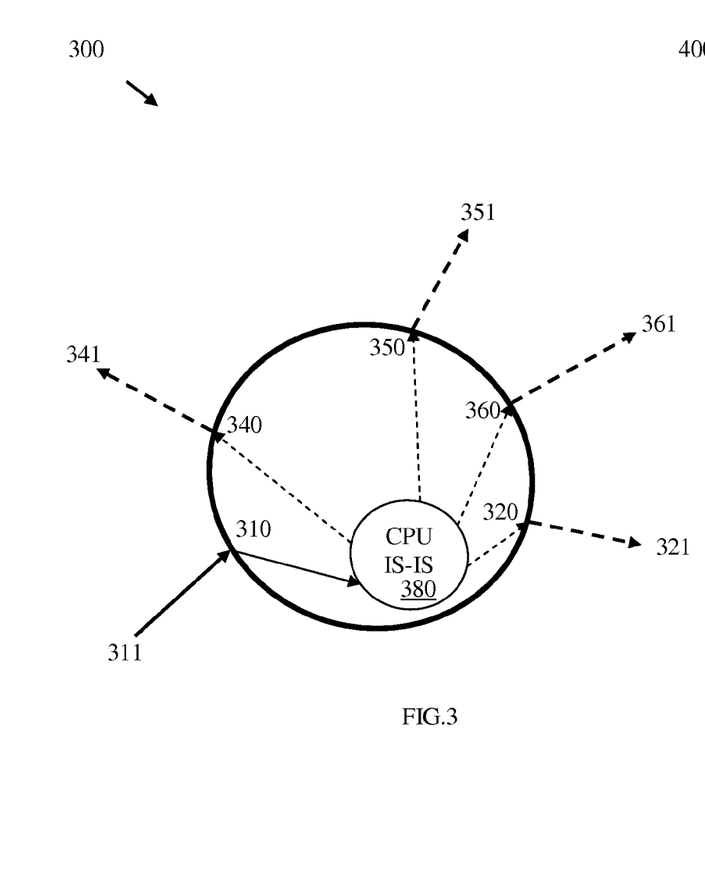
FIG. 3 illustrates a node configured to perform convention link state distributions according to an IGP.

FIG. 3 illustrates a node 300 configured to perform link state distributions according to an IGP in a link state network. The node 300 may comprise a plurality of interfaces 310, 320, 340, 350, 360 and an IS-IS CPU 380. Like the node 100, each of the node's 300 interfaces 310, 320, 340, 350, 360 may be connected to one of a plurality of neighboring nodes in the link state network via a respective one of a plurality of links 311, 321, 341, 351, 361. In an embodiment, the IS-IS CPU 380 may be configured to perform link state functions, including link distributions and the building/updating of LSDBs. Specifically, the IS-IS CPU 380 may perform link state distributions (e.g., according to an IGP, such IS-IS) by forwarding link state packets received on one of the interfaces 310, 320, 340, 350, 360 over each of the other interfaces 310, 320, 340, 350, 360 (except the one on which the link state packet was received). For instance, the CPU 380 may be configured to receive a link state packet on the interface 310 (solid line), and flood the link state packet (or replicated link state packets corresponding to the received link state packet) over each of the remaining interfaces 310, 320, 340, 350, 360.

The IS-IS CPU 380 may perform link state functions by executing software instructions. For instance, the link state packet received over on the interface 310 may be forwarded to the IS-IS CPU 380 for processing, before being flooded over the remaining interfaces 310, 320, 340, 350, 360. In an embodiment, the IS-IS CPU 380 may be configured to update a link state database (LSDB) based on the link state information contained in the link state packet. Additionally, the IS-IS CPU may be configured to replicate the link state packet, thereby producing a plurality of replicated link state packets which may be forwarded over the remaining interfaces 320, 340, 350, 360.

Figure 4:
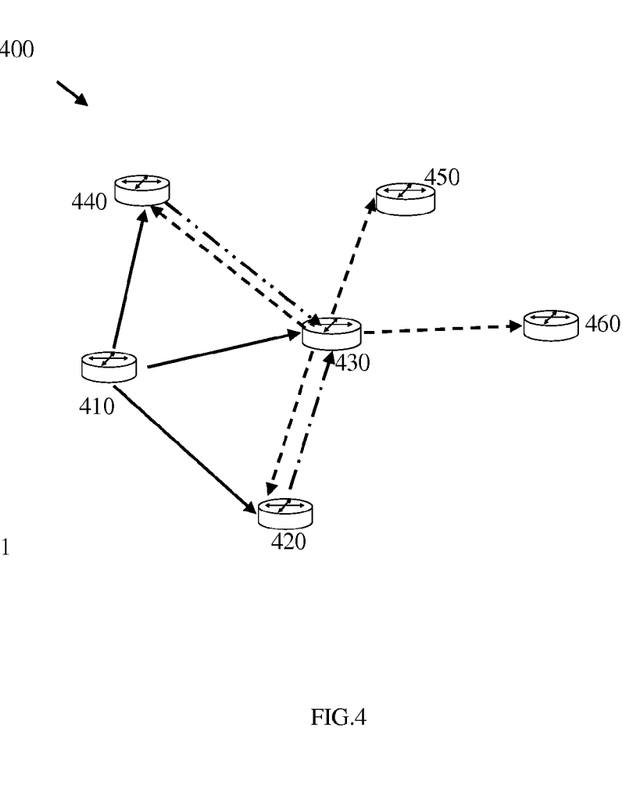
FIG. 4 illustrates a link state network over which a conventional link state distribution is performed according to an IGP.

FIG. 4 illustrates a link state network 400 over which a conventional link state distributions may be performed according to an IGP. The link state network 400 may comprise a plurality of network nodes 410-460, which may be similar in some ways to the network nodes 210-260 depicted in FIG. 2. In an embodiment, the network node 430 may correspond to the node 300 (depicted in FIG. 3), and the network nodes 410, 420, 440, 450, and 460 may correspond to the neighboring nodes connected to the node 300 via the links 311, 321, 341, 351, 361 (respectively). In an embodiment, the node 410 may be the source from which a link state packet originates, and consequently the node 410 may flood the link state packet (solid arrows) to each of the nodes 420-440 (i.e., the neighboring nodes of the node 410). Upon reception, the nodes 420-440 may replicate the link state packet to produce a plurality of replicated link state packets (i.e., packets that are substantially identical to the received link state packet), and flood the replicated link state packets to each of their neighboring nodes except to the node 410 from which the link state packet was received.

In an embodiment, the nodes 410-460 may be configured to forward replicated link state packets as quickly as possible (e.g., without built-in delays designed to reduce the number of link state distributions). For instance, the node 420 may flood a replicated link state packet (dot-dashed arrow) to the node 430, the node 430 may flood replicated link state packets (dotted arrow) to each of the nodes 420 and 440-460, and the node 440 may flood a replicated link state packet (dot-dot-dashed arrow) to the node 430. In such embodiments, the link state distributions between the node 430 and the respective nodes 420, 440 may take place substantially concurrently (or at least in so far as they do not reduce redundant link state distributions). As such, the exemplary link state distribution in the link state network 400 may include at least four redundant links state distributions, including a link state distribution from the node 420 to the node 430 (dot-dashed arrow), a link state distribution from the node 430 to the node 420

(dashed arrow), a link state distribution from the node 440 to the node 430 (dot-dot-dashed arrow), and a link state distribution from the node 430 to the node 440 (dashed arrow).

Figure 5:
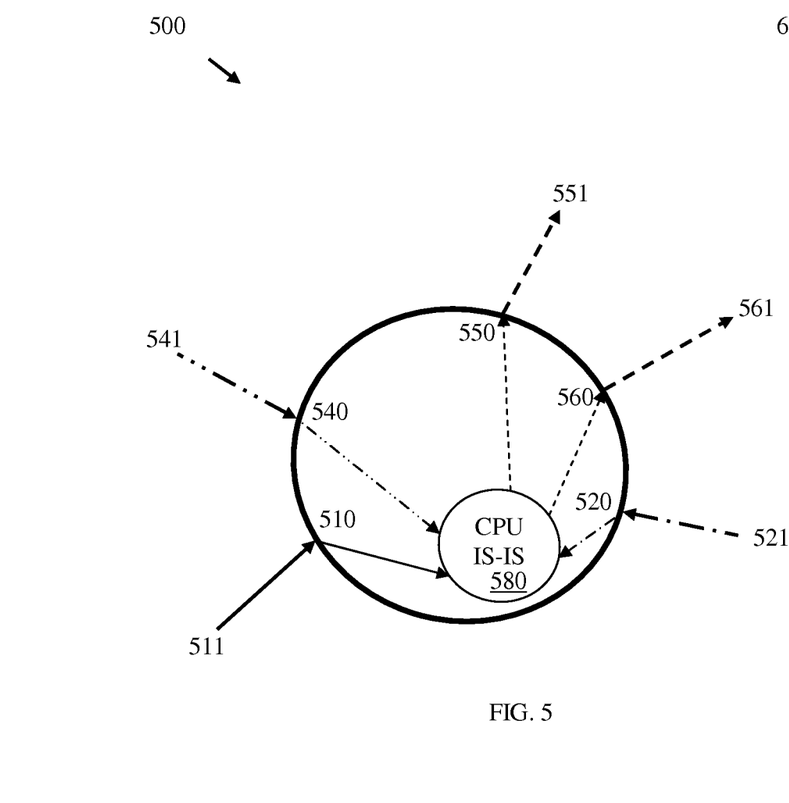
FIG. 5 illustrates a node configured to perform conventional link state distributions according to an IGP that implements a built-in delay between the reception and forwarding of link state packets.

To reduce the number of redundant link state distributions, one or more of the nodes in a link state network may be configured with a built-in delay, or a period for which the node defers sending replicated link state packets following reception of the original link state packet to determine whether any of the node's neighbors have already received the link state packet. In other words, the node may wait to see if a replicated link state packet is received from any neighboring nodes during a delay period following the reception of an original link state packet, and (if so) not forward a replicated link state packet to those nodes from which an equivalent link state packet (replicated or otherwise) was received. FIG. 5 illustrates a node 500 configured to perform link state distributions according to an IGP that implements a built-in delay between the reception of a link state packet and the forwarding of replicated link state packets. The node 500 may comprise a plurality of interfaces 510, 520, 540, 550, 560 and an IS-IS CPU 580. Like the node 100, each of the node's 500 interfaces 510, 520, 540, 550, 560 may be connected to one of a plurality of neighboring nodes in the link state network via a respective one of a plurality of links 511, 521, 541, 551, 561.

In an embodiment, the node 500 may be configured to perform link state distributions according to an IGP (e.g., IS-IS) that implements a delay between the reception of a link state packet and the forwarding of replicated link state packets. Like the IS-IS CPU 380, the IS-IS CPU 580 may be configured to receive a link state packet on the interface 310 (solid line), produce a plurality of link state packets, and flood the replicated link state packets to at least some of the neighboring nodes. However, rather than flooding the replicated packets immediately (or as quickly as reasonably possible), the IS-IS CPU 580 may instead defer flooding the replicated packets for a built-in delay period during which the IS-IS CPU 580 may determine whether any other equivalent link state packets (e.g., replicated link state packets corresponding to the link state packet received over the interface 510) are received over any of the remaining interfaces. For instance, the IS-IS CPU 580 may receive an equivalent link state packet over the interface 520 and the interface 540 during the built-in delay period. Although the IS-IS CPU 580 may ignore the content of the replicated packets, the IS-IS CPU 580 may acknowledge that the corresponding neighboring nodes (i.e., those nodes interconnected via the links 541 and 521) have already received the link state distribution. Accordingly, the IS-IS CPU 580 may determine that it is unnecessary to forward a link state packet to the neighboring nodes corresponding to the links 541 and 521, and consequently the IS-IS CPU 580 may forward the replicated link state packets over the interfaces 550 and 560, but not over the interfaces 510, 520, 540 (i.e., not the interfaces over which an equivalent link state packet was received).

Figure 6:
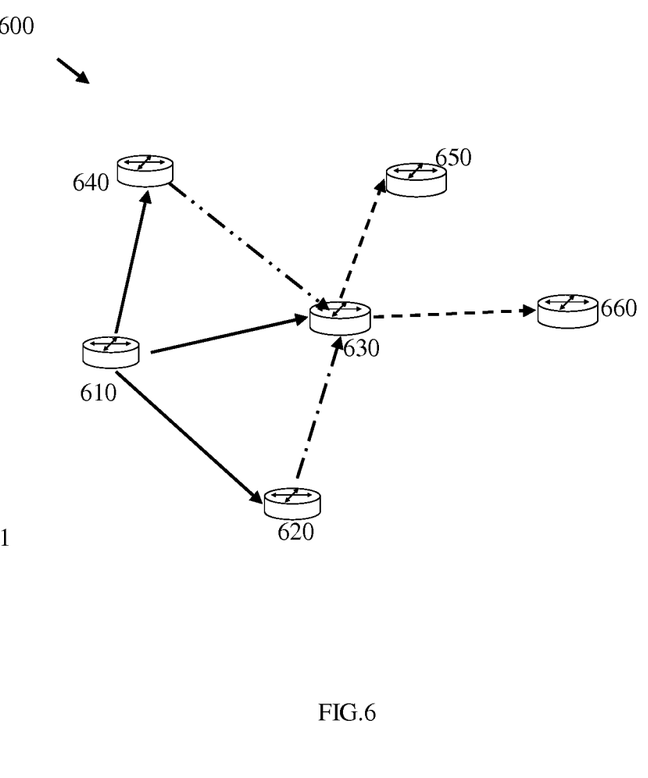
FIG. 6 illustrates a link state network over which a conventional link state distribution is performed according to an IGP that implements a built-in delay between the reception and forwarding of link state packets.

FIG. 6 illustrates a link state network 600 over which link state distributions may be performed according to an IGP that includes a built-in delay for the node 630. The link state network 600 may comprise a plurality of network nodes 610-660, which may be similar in some ways to the network nodes 210-260 depicted in FIG. 2. For instance, the network node 630 may correspond to the node 500 (depicted in FIG. 5), and the network nodes 610, 620, 640, 650, and 660 may correspond to the neighboring nodes connected to the node 500 via the links 511, 521, 541, 551, 561 (respectively). The node 610 may be the source from which a link state packet originates, and consequently may flood the link state packet (solid arrows) to each of the nodes 620-640 (i.e., the neighboring nodes of the node 610). Upon reception, the nodes 620 and 640 may immediately replicate the link state packet, and flood the replicated link state packets to each of their neighboring nodes except to the node 410 from which the link state packet was received.

However, the node 630 may be configured to implement a built-in delay between receiving the link state packet from the node 610 and forwarding the replicated link state packets to the corresponding neighboring nodes. For instance, assume that the node 630 receives a replicated link state packet (dot-dashed arrow) from the node 620, and (thereafter) receives a replicated link state packet (dot-dot-dashed arrow) from the node 640 during the delay period. In such a case, the node 630 may send replicated link state packets (dotted arrows) to the nodes 650 and 660, but not to the nodes 610, 620, and 640 (i.e., the nodes from which an equivalent link state packet was received), thereby reducing the number of redundant link state distributions. Hence, the techniques deployed in FIG. 6 may achieve fewer redundant link state distributions at the expense of delaying link state distributions (e.g., increased convergence/re-convergence periods) in the link state network 400. Furthermore, the techniques deployed in FIG. 6 may not completely eliminate the distribution of redundant link state packets in the link state network 600. Specifically, the link state distribution in the link state network 600 may include at least two redundant links state distributions, including a link state distribution from the node 620 to the node 630 (dot-dashed arrow, and a link state distribution from the node 640 to the node 630 (dot-dot-dashed arrow).

In contrast to the prior art techniques discussed above, deterministically forwarding link state packets on an MPLS tree completely eliminates redundant link state distributions without implementing costly delays. Additionally, the MPLS forwarding techniques discussed herein (e.g., the replication/forwarding of link state packets) may be implemented in hardware (rather than the equivalent software processing, e.g., as performed by an IS-IS CPU), and consequently link state distributions may be far swifter than prior art techniques.

Figures 7, 8:
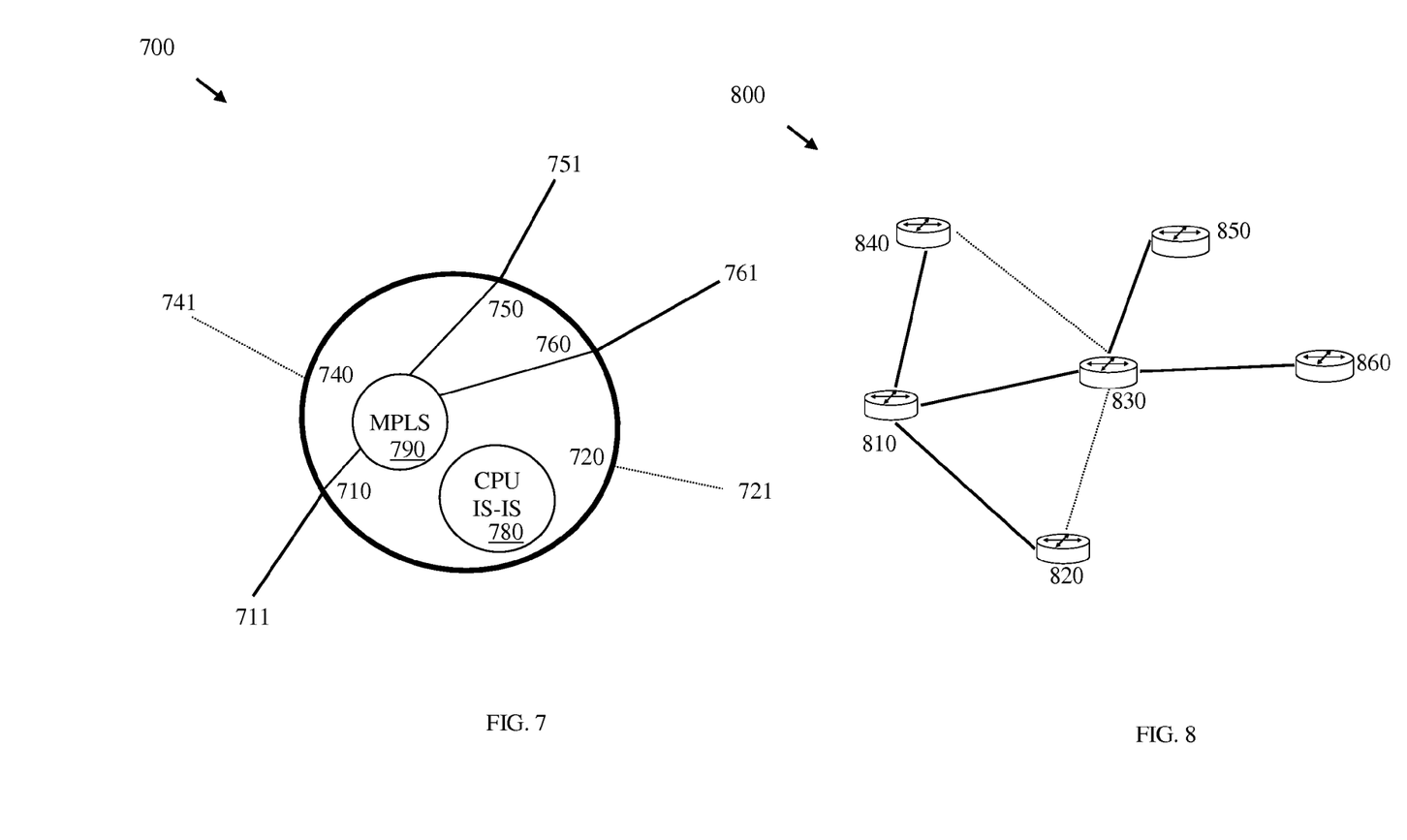
FIG. 7 illustrates an embodiment of a node adapted to configure an MPLS tree for forwarding link state packets on some of its interfaces.
FIG. 8 illustrates an embodiment of a link state network over which an MPLS tree for forwarding link state packets is established.

FIG. 7 illustrates a node 700 adapted to configure an MPLS tree on some of its interfaces. The node 700 may comprise a plurality of interfaces 710, 720, 740, 750, 760, an IS-IS CPU 780, and an MPLS nodal control processor 790. Like the node 100, each of the node's 700 interfaces 710, 720, 740, 750, 760 may be connected to one of a plurality of neighboring nodes in the link state network via a respective one of a plurality of links 711, 721, 741, 751, 761.

In an embodiment, the MPLS nodal control processor 790 may be any component configured to perform MPLS functions, which may include forwarding link state packets appended with an MPLS label on the MPLS tree. Specifically, the MPLS nodal control processor 790 may configure the MPLS tree on the interfaces 710, 750, and 760 such that appropriately labeled link state packets are deterministically forwarded in the manner described herein.

FIG. 8 illustrates a link state network 800 over which an MPLS tree (solid lines) has been established. The network 800 may comprise a plurality of network nodes 810-860, which may be similar in some ways to the network nodes 210-260 depicted in FIG. 2. In an embodiment, the network node 830 may correspond to the node 700 (depicted in FIG. 7), and the network nodes 810, 820, 840, 850, and 860 may correspond to the neighboring nodes connected to the node 700 via the links 711, 721, 741, 751, 761 (respectively). In an embodiment, the node 810 may be the root of the MPLS tree, and the nodes 820, 840, 850, and 860 may be the leaves of the MPLS tree. As seen in FIG. 8, the MPLS tree may branch through the node 830 to the nodes 850 and 860. As used herein, the term 'root node' may refer to a node from which the trunk of the MPLS tree originates (e.g., node 810 in FIG. 8), the term 'branch node' may refer to any intermediate node through which the MPLS tree branches (e.g., node 830 in FIG. 8), and the term 'leaf node' may refer to any node in which the MPLS tree (or a branch thereof) terminates (e.g., node 820, 840, 850, 860 of FIG. 8).

Figure 9:
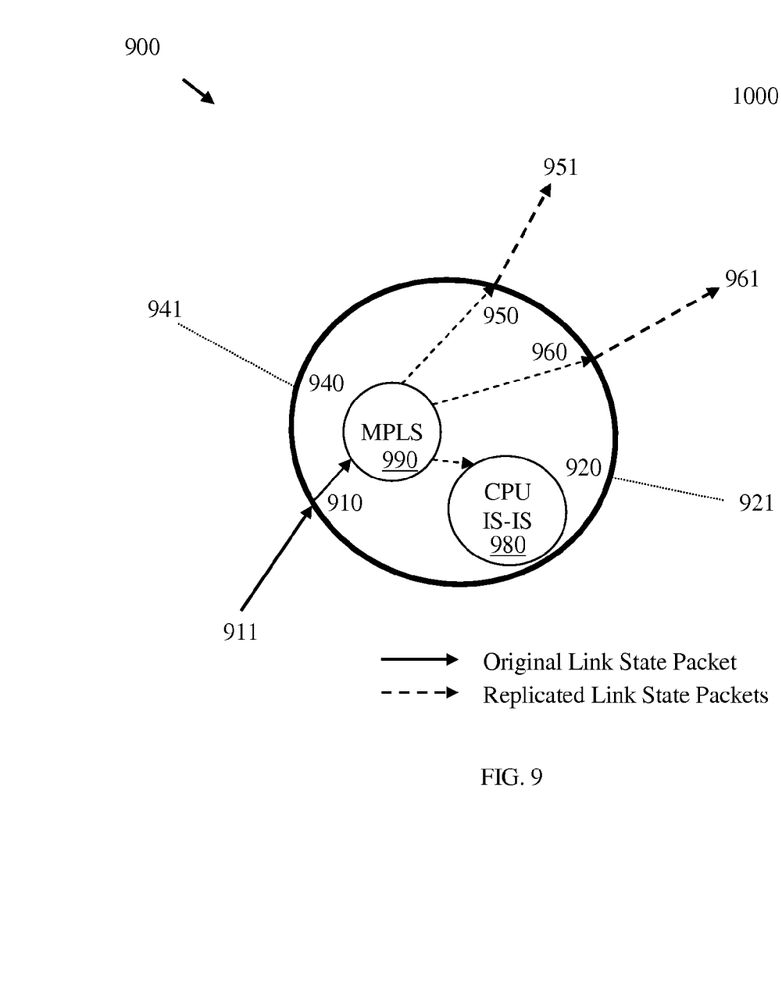
FIG. 9 illustrates an embodiment of a node configured to deterministically forward packets over a link state network according to one or more novel aspects of this disclosure.

FIG. 9 illustrates a node 900 configured to deterministically forward MPLS labeled link state packets over the interfaces of an MPLS tree. The node 900 may comprise a plurality of interfaces 910, 920, 940, 950, 960, an IS-IS CPU 980, and an MPLS nodal control processor 990. Like the node 100, each of the node's 900 interfaces 910, 920, 940, 950, 960 may be connected to one of a plurality of neighboring nodes in the link state network via a respective one of a plurality of links 911, 921, 941, 951, 961.

The node 900 may be similar to the node 700 in that an MPLS tree may be formed from the interface 910 to the interfaces 950 and 960 via the MPLS nodal control module 990. In an embodiment, the node 900 may receive an MPLS labeled link state packet on the interface 910, and immediately replicate the link state packet to form about three replicated link state packets. Two of the replicated link state packets may be immediately forwarded over the interfaces 950, 960, while the third link state packet may be forwarded to the IS-IS CPU 980 for processing. In an embodiment, the third link state packet may be forwarded to the IS-IS CPU 980 after the first two link state packets are forwarded over the interfaces 950, 960 to ensure that the link state update is distributed over the MPLS tree as quickly as possible. In other embodiments, the link state packets may be concurrently forwarded to the IS-IS CPU 980 and the interfaces 950, 960. As shown, the MPLS nodal control processor 990 does not forward replicated link state packets on non-MPLS configured interfaces (i.e., the interfaces 920, 940), or on the MPLS interface over which the original link state packet was received (i.e., the interface 910).

Figure 10:
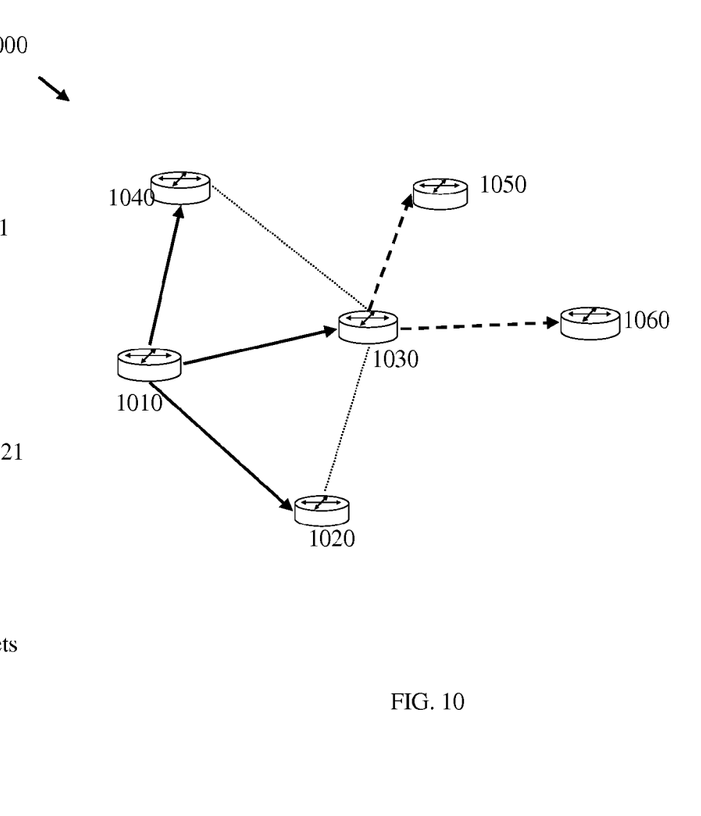
FIG. 10 illustrates an embodiment of a link state network comprising a plurality of nodes configured to deterministically forward packets over a link state network according to one or more novel aspects of this disclosure.

FIG. 10 illustrates a link state network 1000 in which link state packets are deterministically forwarded over an MPLS tree. The link state network 1000 may comprise a plurality of network nodes 1010-1060, which may be similar in some ways to the network nodes 210-260 depicted in FIG. 2. In an embodiment, the network node 1030 may correspond to the node 900 (depicted in FIG. 9), and the network nodes 1010, 1020, 1040, 1050, and 1060 may correspond to the neighboring nodes connected to the node 900 via the links 911, 921, 941, 951, 961 (respectively). In an embodiment, the node 1010 may be the root of the MPLS tree, and may forward MPLS labeled link state packets to each of the nodes 1020, 1030, and 1040. Upon reception, the nodes 1020, 1030, and 1040 may forward MPLS labeled link state packets only on those interfaces for which the MPLS tree is configured. In the embodiment depicted in FIG. 10, the nodes 1020 and 1040 may be leaves of the MPLS tree, and consequently may not forward MPLS labeled link state packets received from the node 1010. Further, the node 1030 may forward replicated MPLS labeled link state packets on MPLS configured interfaces, rather than flooding the MPLS labeled link state packets according to an IGP. Consequently, the node 1030 may forward the replicated MPLS labeled link state packets to the nodes 1050 and 1060, without forwarding any replicated link state packets to the nodes 1030 or 1040. As such, the nodes 1020, 1030, and 1040 may behave quite differently than the nodes 420, 430, 440 and the nodes 620, 630, 640 (discussed above), which may redundantly forward link state packets to one another.

As can be seen by comparing FIGS. 6 and 10, deterministically forwarding link state packets over an MPLS tree may achieve significant advantages over the prior art method of flooding link state packets based on an IGP (even when a built-in delay period is implemented). Specifically, the MPLS forwarding technique disclosed herein completely eliminates redundant link state distributions while substantially decreasing convergence/re-convergence periods through avoiding built-in delays as well as by performing the forwarding in hardware (rather than software).

Figure 11:
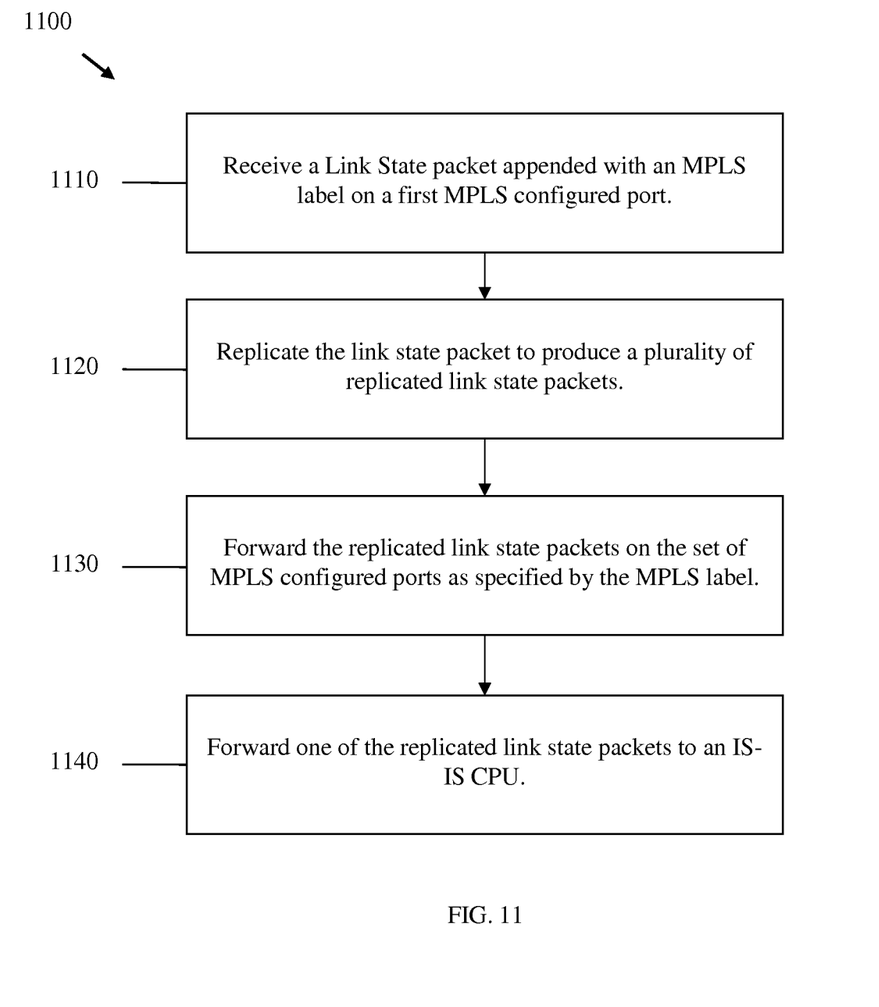
FIG. 11 illustrates an embodiment of a method for receiving and deterministically forwarding link state packets over MPLS configured interfaces by an MPLS nodal control processor.

FIG. 11 illustrates an embodiment of a method 1100 for receiving and forwarding link state packets over an MPLS tree by a MPLS nodal control processor. The method 1100 may begin at block 1110, where the MPLS nodal control processor may receive a link state packet that is appended with an MPLS label on a first MPLS configured port. As used herein, the terms 'port' and 'interface' may be used interchangeably. Next, the method 1100 may proceed to block 1120, where the MPLS nodal control processor may replicate the link state packet into a plurality of replicated link state packets. Subsequently, the method 1100 may proceed to block 1130, where the MPLS nodal control processor may forward all but one of the replicated link state packets over the set of MPLS configured ports as specified by the MPLS label. In some embodiments, the link state packet appended with the MPLS label may be received on a 'branch interface' (e.g., an interface that is connected to a leaf of the MPLS tree) rather than on a 'trunk interface' (e.g., an interface that is connected to the trunk of the MPLS tree). In such embodiments, the MPLS nodal control processor may transmit the replicated link state packets (i.e., which are also appended with the MPLS label) in both directions, namely: upstream toward the root of the MPLS tree; and (potentially) downstream on each of the remaining 'branching interfaces' (e.g., assuming the MPLS tree branches towards multiple leaves at the node). Finally, the method may proceed to block 1140, where one of the replicated link state packets may be forwarded to the IS-IS CPU (or equivalent). In some embodiments, the steps in blocks 1130 and 1140 may be performed concurrently such that the replicated packets are forwarded over the MPLS ports and to the IS-IS CPU at approximately the same time. In other embodiments, the steps in block 1140 may be performed before those in block 1130.

Figure 12:
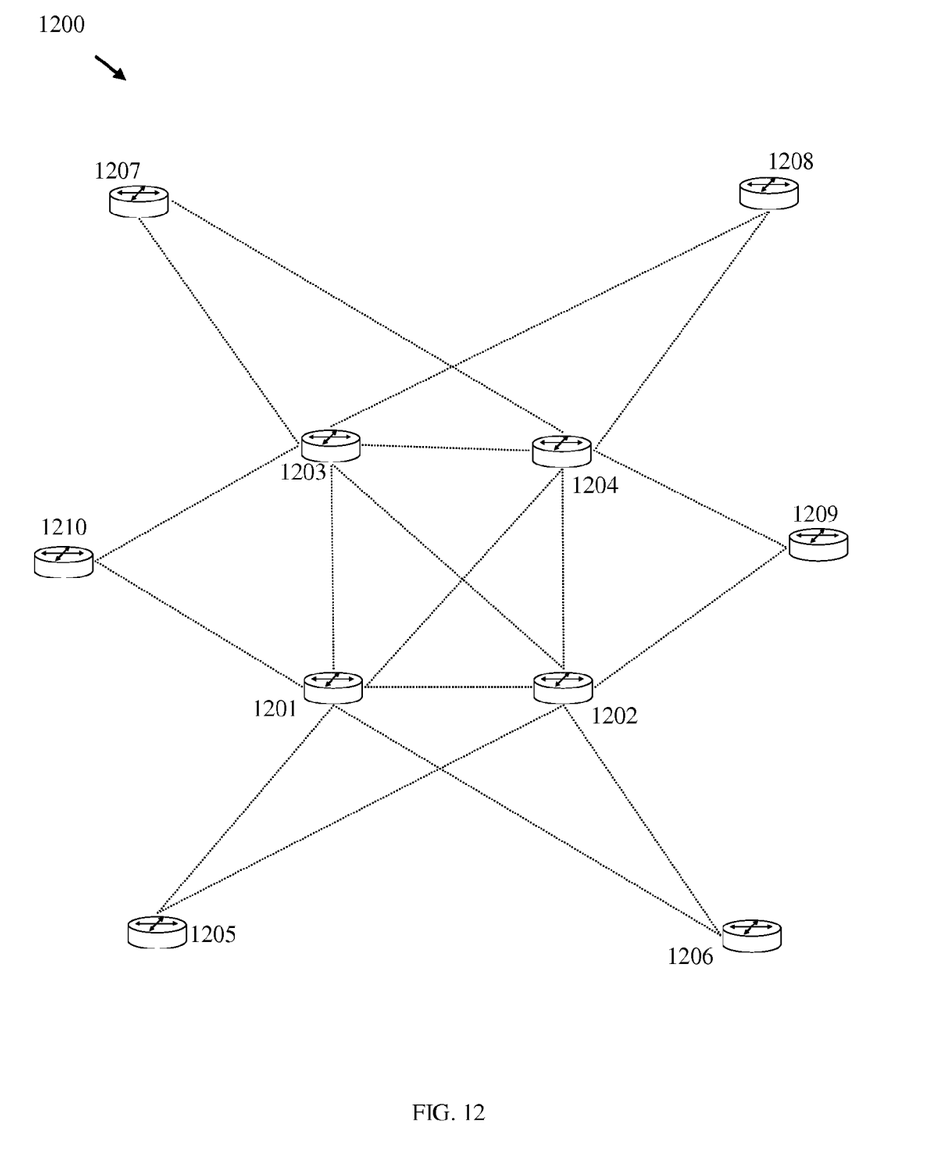
FIG. 12 illustrates a link state mesh network.
Figure 13:
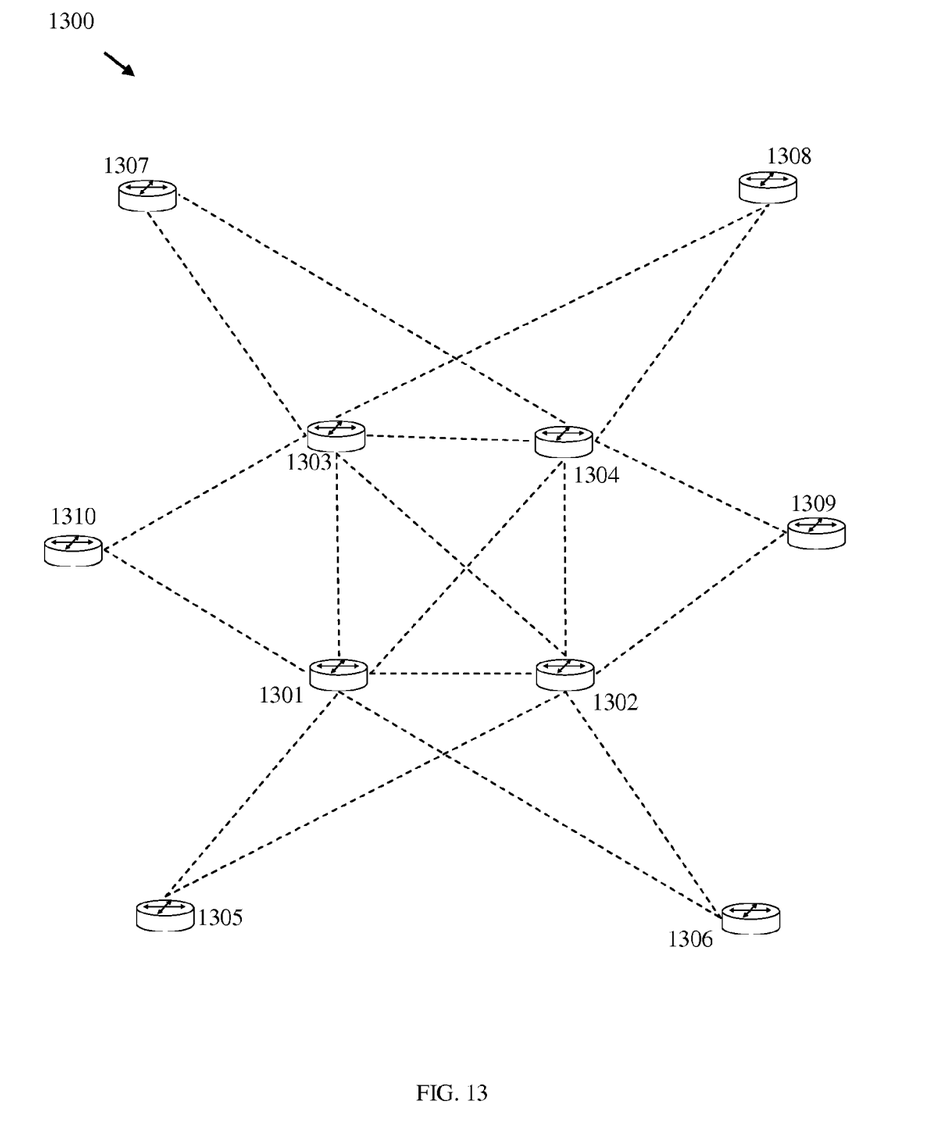
FIG. 13 illustrates a link state mesh network over which a conventional link state distribution is performed according to an IGP.
Figure 14:
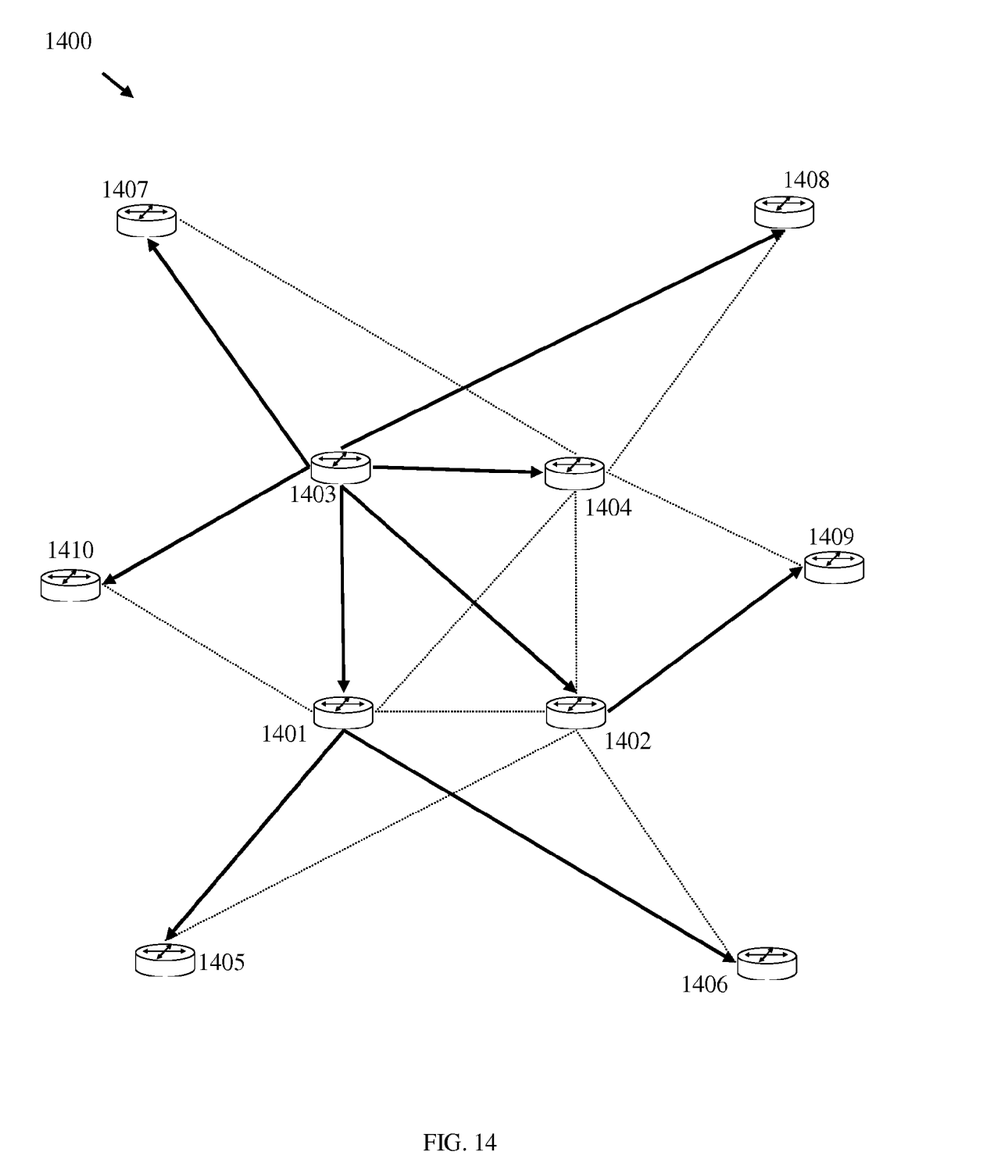
FIG. 14 illustrates a link state mesh network over which an MPLS tree for deterministically forwarding link state packets is established.

FIGS. 12-14 illustrate the advantages of the MPLS forwarding techniques disclosed herein when implemented in a link state mesh network. FIG. 12 illustrates a link state mesh network 1200 comprising a plurality of interconnected nodes 1201-1210. The nodes 1201-1210 may be configured similarly (in some ways) to the nodes 210-260 in FIG. 2, and may be interconnected via a plurality of intermediate links (dotted-lines). FIG. 13 illustrates a link state mesh network 1300 comprising a plurality of interconnected nodes 1301-1310 that are configured to participate in a link state software broadcast over the intermediate links (dashed lines) according to an IGP (e.g., an IS-IS protocol). The nodes 1301-1310 may be configured similarly (in some ways) to the nodes 1201-1210 in FIG. 12, but may flood link state packets over each of the intermediate links (i.e., dashed lines). Although this may effectively distribute the relevant link state information throughout the link state network 1300, it may also consume a lot of network resources (e.g., bandwidth, processing capacities, etc.).

FIG. 14 illustrates an embodiment of link state network 1400 comprising a plurality of interconnected nodes 1401-1410 that are configured to participate in a link state hardware broadcast over the links forming an MPLS tree (solid arrows). The nodes 1401-1410 may be configured similarly (in some ways) to the nodes 1301-1310 in FIG. 13, but may deterministically forward link state packets over the links making up the MPLS tree (solid arrows) in the link state network 1400, rather than flooding link state packets over all of the links in the network 1400 (e.g., packets are not forwarded over the dotted lines). For instance, the node 1403 may be a root node, the nodes 1401, 1402 may be branch nodes, and the nodes 1404-1410 may be the leaf nodes. In one embodiment, the node 1403 (i.e., the root node) may be the source of the original link state packet, and (as a result) the link state distribution may flow downstream through each of the nodes 1401, 1402 to each of the leaf nodes 1404-14010.

In other embodiments, a leaf node or a branch node may be the source of the original link state packet, and consequently the link state packets may flow in both directions (i.e., upstream and downstream) on the MPLS tree. For instance, if the node 1401 detects an adjacency change, it may forward link state packets in the upstream direction (e.g., towards the node 1403), as well as in the downstream direction (e.g., towards the nodes 1405 and 1406).

Figure 15:
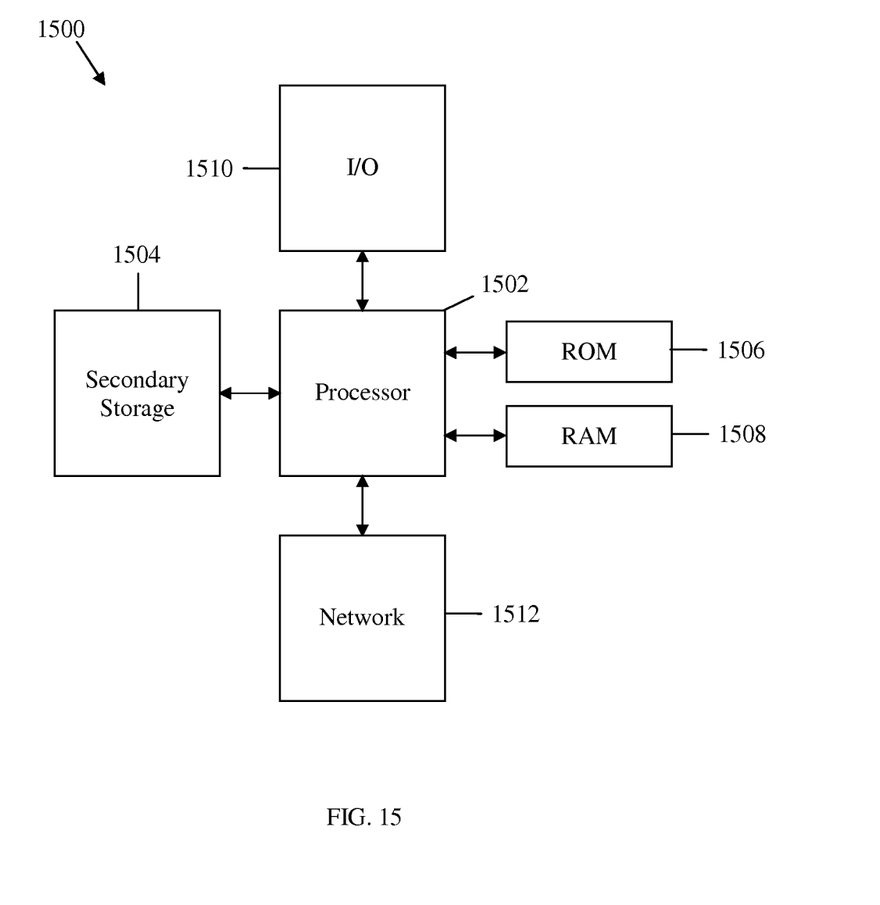
FIG. 15 illustrates a schematic diagram of an embodiment of a network unit for transporting data through a network.

The network components described above may be implemented on any general-purpose network component, such as a computer or network component with sufficient processing power, memory resources, and network throughput capability to handle the necessary workload placed upon it. FIG. 15 illustrates a typical, general-purpose network component 1500 suitable for implementing one or more embodiments of the components disclosed herein. The network component 1500 includes a processor 1502 (which may be referred to as a central processor unit or CPU) that is in communication with memory devices including secondary storage 1504, read only memory (ROM) 1506, random access memory (RAM) 1508, input/output (I/O) devices 1510, and network connectivity devices 1512. The processor 1502 may be implemented as one or more CPU chips, or may be part of one or more application specific integrated circuits (ASICs).

The secondary storage 1504 is typically comprised of one or more disk drives or erasable programmable ROM (EPROM) and is used for non-volatile storage of data. Secondary storage 1504 may be used to store programs that are loaded into RAM 1508 when such programs are selected for execution. The ROM 1506 is used to store instructions and perhaps data that are read during program execution. ROM 1506 is a non-volatile memory device that typically has a small memory capacity relative to the larger memory capacity of secondary storage 1504. The RAM 1508 is used to store volatile data and perhaps to store instructions. Access to both ROM 1506 and RAM 1508 is typically faster than to secondary storage 1504.

Figure 16:
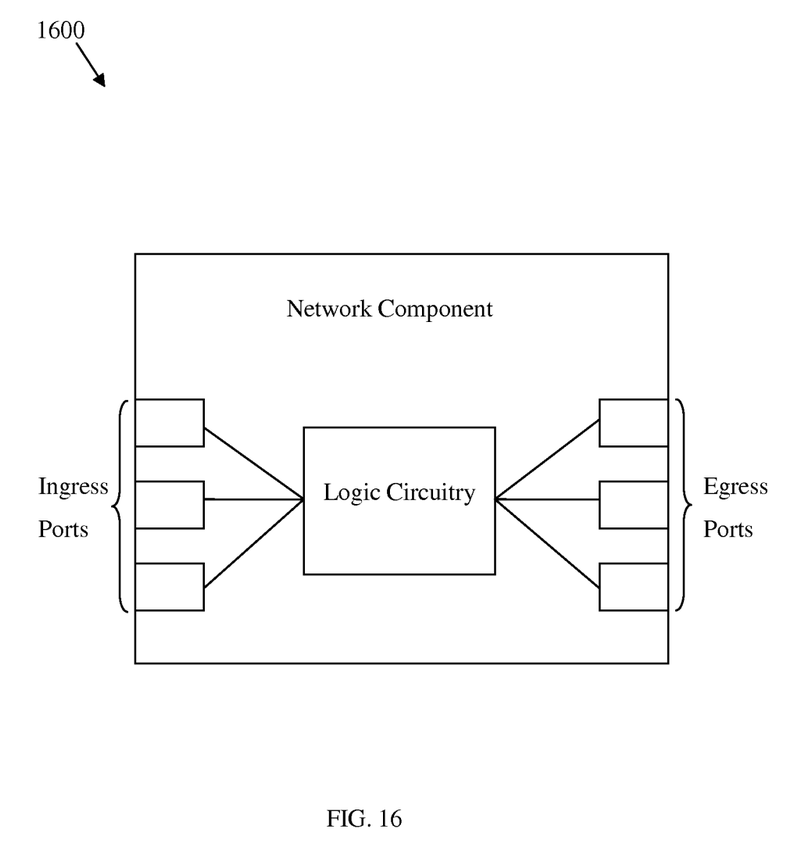
FIG. 16 illustrates a schematic diagram of an embodiment of a general-purpose network component.

At least some of the features/methods described in the disclosure may be implemented in a network apparatus or component, such as a network node. For instance, the features/methods in the disclosure may be implemented using hardware, firmware, and/or software installed to run on hardware. The network apparatus/component or node may be any device that transports frames through a network, e.g. a switch, router, bridge, server, etc. As shown in FIG. 16, the network apparatus/component 1600 may comprise a plurality of ingress ports or units for receiving frames from other nodes, logic circuitry to determine which nodes to send the frames to, and a plurality of egress ports or units for transmitting frames to the other nodes. The ingress and/or egress ports may contain electrical and/or optical transmitting and/or receiving components.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A link state network comprising:
  a plurality of interconnected nodes; and
  a multiprotocol label switching (MPLS) tree established amongst at least some of the interconnected nodes, wherein the MPLS tree is associated with an MPLS label,
wherein the interconnected nodes are configured to deterministically forward a plurality of replicated link state update (LSU) packets comprising the MPLS label over the MPLS tree,
wherein at least one of the interconnected nodes comprise an MPLS nodal control processor and a plurality of interfaces used to link other interconnected nodes, and
wherein the MPLS nodal control processor is configured to:
  replicate a received LSU packet that comprises the MPLS label to produce one or more of the replicated LSU packets; and
  forward the replicated LSU packets via interfaces that correspond to the MPLS tree without forwarding the packets via interfaces that do not correspond to the MPLS tree.

2. The link state network of claim 1, wherein the at least one of the interconnected nodes further comprise a central processing unit (CPU) that performs interior gateway protocol (IGP) functions, and wherein the replicated LSU packets are deterministically forwarded over the MPLS tree by the MPLS nodal control process.

3. The link state network of claim 2, wherein the MPLS nodal control processor is further configured to forward at least one of the replicated LSU packets to the CPU.

4. The link state network of claim 3, wherein the MPLS nodal control processor is further configured to forward the at least one of the replicated LSU packets to the CPU after forwarding the replicated LSU packet via the interfaces that correspond to the MPLS tree.

5. The link state network of claim 1, wherein the replicated LSU packets are forwarded to all of the interfaces that correspond to the MPLS tree excluding the interface that received the received LSU packet.

6. The link state network of claim 1, wherein at least some of the interfaces do not correspond to the MPLS tree.

7. A link state network comprising:
a plurality of interconnected nodes; and
a multiprotocol label switching (MPLS) tree established amongst at least some of the interconnected nodes,
wherein the MPLS tree is associated with an MPLS label,
wherein the interconnected nodes are configured to deterministically forward a plurality of link state update (LSU) packets comprising the MPLS label over the MPLS tree,
wherein the plurality of interconnected nodes comprise:
  a plurality of neighboring nodes; and
  a network node coupled directly to a different one of the neighboring nodes via a plurality of links, wherein the MPLS tree is established over a first one of the plurality of links and a second one of the plurality of links,
wherein the MPLS tree is not established over a third one of a plurality of links, and
wherein the network node comprises an MPLS nodal control processor that is configured to:
  receive a first one of the LSU packets on the first link;
  replicate the first LSU packet to produce at least one replicated LSU packet; and
  forward the replicated LSU packet on the second link without forwarding the first LSU packet or any of the replicated LSU packets over the third link.

8. A link state network comprising:
a plurality of interconnected nodes;
a root node;
at least one leaf node; and
a multiprotocol label switching (MPLS) tree established amongst at least some of the interconnected nodes,
wherein the MPLS tree is associated with an MPLS label,
wherein the interconnected nodes are configured to deterministically forward a plurality of link state update (LSU) packets comprising the MPLS label over the MPLS tree,
wherein the plurality of interconnected nodes comprise:
  a plurality of neighboring nodes; and
  a network node coupled directly to a different one of the neighboring nodes via a plurality of links, wherein the MPLS tree is established over a first one of the plurality of links and a second one of the plurality of links,
wherein the network node is connected to the root node via the first link and to the leaf node via the second link, and
wherein the network node is configured to:
  detect a change in a nodal adjacency pertaining to the network node;
  generate a first one of the plurality of LSU packets, wherein the first LSU packet describes the change in the nodal adjacency;
  append the MPLS label to the first LSU packet; and
  forward the first LSU packet over both the first link and the second link such that the first LSU packet is deterministically forwarded in both directions on the MPLS tree.

9. A network node in a link state network comprising:
a plurality of interfaces including a first interface, a second interface, and a third interface, wherein each interface is linked to a different one of a plurality of neighboring nodes in the link state network, and wherein an multiprotocol label switching (MPLS) tree is configured on the first interface and the second interface, but not on the third interface; and
a nodal control processor for performing MPLS functions, wherein the nodal control processor is configured to:
  replicate a link state update (LSU) packet received on the first interface to produce a plurality of replicated LSU packets; and
  forward a first one of the replicated LSU packets over the second interface without forwarding any of the replicated LSU packets over the third interface.

10. The network node of claim 9 further comprising a central processing unit (CPU) for performing interior gateway protocol (IGP) functions, wherein the first replicated LSU packet is forwarded over the second interface without being processed by the CPU.

11. The network node of claim 10, wherein the nodal control processor is further configured to forward a second one of the replicated LSU packets to the CPU for processing, and wherein the first replicated LSU packet is forwarded over the second interface before the second replicated LSU packet is processed by the CPU.

12. The network node of claim 11, wherein the nodal control processor forwards the first replicated LSU packet over the second interface before forwarding the second LSU packet to the CPU.

13. The network node of claim 11, wherein the nodal control processor forwards the first replicated LSU packet and the second LSU packet concurrently such that both MPLS forwarding functions are performed at substantially the same time.

14. A method comprising:
generating a link state update (LSU) packet describing one or more nodal adjacencies for a node in a link state network, appending a multiprotocol label switching (MPLS) label to the LSU packet, wherein the MPLS label identifies an MPLS tree that extends through the link state network;
replicating LSU packet to produce one or more replicated LSU packets, wherein each of the LSU packets comprise the MPLS label; and
deterministically forwarding the replicated LSU packet over the MPLS tree,
wherein the link state network comprises of adjacent nodes coupled to the node via a plurality of links,
wherein at least some of the adjacent nodes reside on the MPLS tree, and
wherein the replicated LSU packets are forwarded to the adjacent nodes that reside on the MPLS tree without forwarding the LSU packets to the adjacent nodes that do not reside on the MPLS tree.

15. The method of claim 14, further comprising generating the LSU packet when a change in a nodal adjacency pertaining is detected by the node, and deterministically forwarding the replicated LSU packets in both directions on the MPLS tree.

16. The method of claim 14, wherein the LSU packet is replicated within the node's nodal control processor and not within the node's central control processor (CPU).

17. The method of claim 14, wherein the replicated LSU packets are concurrently forwarded to the adjacent nodes and a central control processor (CPU) within the node.

18. The method of claim 14, wherein the LSU packets that comprise the MPLS label are not flooded to all of the adjacent nodes from the node, and wherein at least some of the links are not associated with the MPLS tree.

19. A method comprising:
generating a link state update (LSU) packet describing one or more nodal adjacencies in a link state network, wherein the link state network comprises a plurality of nodes, at least some of which reside on a multiprotocol label switching (MPLS) tree extending through the link state network;
appending an MPLS label to the LSU packet, wherein the MPLS label is associated with the MPLS tree; and
deterministically forwarding the LSU packet over the MPLS tree,
wherein the LSU packet is deterministically forwarded throughout the link state network by a plurality of MPLS nodal control processors residing in the nodes, and
wherein the MPLS nodal control processors deterministically forward the LSU packet over the MPLS tree without flooding the LSU packet according to an interior gateway protocol (IGP).

20. A method comprising:
generating a link state update (LSU) packet describing one or more nodal adjacencies in a link state network, wherein the link state network comprises a plurality of nodes, at least some of which reside on a multiprotocol label switching (MPLS) tree extending through the link state network;
appending an MPLS label to the LSU packet, wherein the MPLS label is associated with the MPLS tree;
deterministically forwarding the LSU packet over the MPLS tree;
generating a second LSU packet; and
distributing the second LSU packet throughout the link state network by flooding the second LSU packet amongst the network nodes according to an interior gateway protocol (IGP), wherein the MPLS label is not appended to the second LSU packet.

* * * * *

UNITED STATES PATENT AND TRADEMARK OFFICE
CERTIFICATE OF CORRECTION

PATENT NO.       : 8,761,053 B2
APPLICATION NO.  : 13/370044
DATED            : June 24, 2014
INVENTOR(S)      : Peter Ashwood-Smith It is certified that error appears in the above-identified patent and that said Letters Patent is hereby corrected as shown below:

In the Claims

Column 11, Lines 18-25, Claim 2 should read:

The link state network of claim 1, wherein the at least one of the interconnected nodes further comprise a central processing unit (CPU) that performs interior gateway protocol (IGP) functions, and wherein the replicated LSU packets are deterministically forwarded over the MPLS tree by the MPLS nodal control processors.

Columns 13-14, Lines 64-16, Claim 14 should read:

A method comprising:
  generating a link state update (LSU) packet describing one or more nodal adjacencies for a node in a link state network;
  appending a multiprotocol label switching (MPLS) label to the LSU packet, wherein the MPLS label identifies an MPLS tree that extends through the link state network;
replicating the LSU packet to produce one or more replicated LSU packets, wherein each of the LSU packets comprise the MPLS label; and
  deterministically forwarding the replicated LSU packet over the MPLS tree,
wherein the link state network comprises a plurality of adjacent nodes coupled to the node via a plurality of links,
wherein at least some of the adjacent nodes reside on the MPLS tree, and
wherein the replicated LSU packets are forwarded to the adjacent nodes that reside on the MPLS tree without forwarding the LSU packets to the adjacent nodes that do not reside on the MPLS tree.

Signed and Sealed this
Seventh Day of October, 2014

Michelle K. Lee
*Deputy Director of the United States Patent and Trademark Office*